Patented Nov. 17, 1942

2,302,511

UNITED STATES PATENT OFFICE 2,302,511

CARBOHYDRATES AND PROCESS OF MODIFYING THE ABSORBABILITY THEREOF

Roger Wallach, Briarcliff Manor, N. Y., assignor to Sylvania Industrial Corporation, Fredericksburg, Va., a corporation of Virginia No Drawing. Application March 22, 1940, Serial No. 325,397

18 Claims. (Cl. 99—1)

This invention relates in general to carbohydrates, and in particular to a method of treating carbohydrates and foodstuffs comprising carbohydrates to inhibit or control their hyperglycemic reaction upon digestion and to the improved products so treated.

The term "carbohydrates" as used in the specification and claims is intended to include all those compounds having the general formula $C_x(H_2O)_y$ and defined as carbohydrates in Hackh's Chemical Dictionary, Blakiston, Philadelphia, 2nd edition, 1937, pages 185, 186, and also foodstuffs containing one or more carbohydrates, such for example as meats, vegetables, nuts, milk and the like. The expression "hyperglycemia" is the phenomenon comprising the increase in the sugar observed in the blood stream of man and animal after the digestion and absorption of a large quantity of carbohydrates.

In the normal digestion of carbohydrates it is well known that sugars are produced and absorbed in the blood stream giving rise to a hyperglycemic effect. It is a general object of the present invention to inhibit or control the hyperglycemic effect produced by carbohydrates.

It is another object of the invention to provide a method of retarding or inhibiting the digestion and absorption of carbohydrates in the digestive tracts of man and animal.

It is a specific object of the invention to provide a foodstuff comprising carbohydrates which has a reduced absorbability and can be taken in large quantities without producing a marked hyperglycemic reaction and which will have a reduced fattening effect upon the "being" (individual, man or animal) ingesting the same.

It is a further specific object to provide a carbohydrate which can be fed to patients suffering from diabetes without producing a harmful hyperglycemic reaction in such patients.

Other objects of the invention will in part be obvious and will in part appear hereinafter.

It has now been discovered that foodstuffs comprising carbohydrates wholly or partly lose their hyperglycemic effect when taken into the alimentary tract in the presence of one or more water-soluble, non-toxic ethers formed from compounds selected from the group consisting of polyhydroxy aliphatic compounds having the general formula $(C_x(H_2O)_y$ and $C_nH_{2n+2}O_n$ wherein $x$, $y$ and $n$ are integers having a value of 2 or more and in which at least one of the hydroxyl-hydrogens has been substituted by an alkyl group, a hydroxy-alkyl group or a carboxy-alkyl group. The ethers used are preferably those whose aqueous solutions are viscous as compared with glycerine. The present invention resides in inhibiting or controlling the absorption of sugars in the blood stream after the ingestion of carbohydrates. Therefore, according to the present invention there is provided a novel process of retarding or controlling the digestion of carbohydrates by bringing the foodstuff into contact with an ether of the type just defined. The novel effect of the present process lies in the fact that ingestion of carbohydrates in the presence of such compounds results in inhibiting or controlling the absorption of sugars in the blood stream and a reduction of the normal hyperglycemic effect after such ingestion. As a result of a large number of experiments it has been shown that even such doses of carbohydrates as would produce a pronounced hyperglycemic effect when ingested in the absence of the organic ethers of the invention do not produce such effects or produce such effects to only a slight amount in the presence of the organic ethers herein employed.

By way of illustrating, but not by way of limiting the invention, it may be stated that the novel effect of the present invention may be achieved with all classes of carbohydrates alone and on foodstuffs containing carbohydrates. Thus the present process may be utilized for retarding or controlling the digestion and/or absorption of carbohydrates having the general formula $C_x(H_2O)_y$ including mono-saccharides wherein $x$ and $y$ can have the values 2, 3, 4, 5, 6 and 7, di-saccharides wherein $x$ is 12 and $y$ is 11, tri-saccharides wherein $x$ is 18 and $y$ is 16, tetra-saccharides wherein $x$ is 24 and $y$ is 21, poly-saccharides wherein $x$ and $y$ are both integers having a value greater than 18, and conjugated saccharides.

By way of illustration, but not by way of limiting the invention, the present process is applicable to inhibiting or controlling the digestion of mono-saccharides such for example as glucose, fructose, levulose and the like, and of di-saccharides such for example as sucrose, lactose, maltose and the like, also dextrine, starch and conjugated saccharides such as glucosides. The invention is also applicable to all classes of foodstuffs containing carbohydrates, whether such carbohydrates are in the free or combined state, such for example as vegetables and plant products, fruits, nuts, root tubers, seeds, and meat and meat products, milk and milk products and the like. The invention not only comprises the process of inhibiting or controlling the digestion and/or absorption of carbohydrates, but also the product resulting from combining or incorporating the organic ethers with such carbohydrates.

The organic ethers utilized in the invention may be combined or incorporated in the carbohydrate when used alone or in foodstuffs comprising carbohydrates before, during or after their ingestion in the alimentary tract of man and animals but also at any point during the preparation of the carbohydrates or of the foodstuffs for consumption, and in carbohydrates or foodstuffs in their finished state. The invention is applicable to carbohydrates or foodstuffs which are in the form of a solid, solution or colloidal dispersion. For this reason, it is within the scope of the invention to utilize the organic ethers in the liquid or solid state or in solution or colloidal dispersion, that form or state being selected which is best suited for making a compatible admixture with the foodstuff, keeping in mind the point of mixing or combining of the foodstuff and the organic ether.

The amount of the organic ether to be used for a given foodstuff will obviously vary with the nature and type of foodstuff, and on the amount of the inhibiting or retarding effect desired in each but in particular with the percentage of carbohydrate in the foodstuff. In general, the ether comprises from 10 per cent to 50 per cent by weight of the pure carbohydrate (on dry basis).

By way of illustration, but not by way of limiting the invention, there will be given a list of some of the classes of organic ethers which are suitable for use in the invention:

(A) Ethers of carbohydrates having the general formula $C_x(H_2O)_y$ in which at least one of the hydroxyl-hydrogens has been substituted by a hydroxy-alkyl, alkyl, or carboxy-alkyl group, including mixed ethers and ether-esters of carbohydrates of the following classes:

I. Monosaccharides, in which $x$ and $y$ have equal values of from 2 to 7
  1. Bioses ------------------ $C_2H_4O_2$
    *a.* Aldoses—glycoaldehyde
  2. Trioses ------------------ $C_3H_6O_3$
    *a.* Aldoses—glycerose
    *b.* Ketose—dioxyacetone
  3. Tetroses ----------------- $C_4H_8O_4$
    *a.* Aldoses—erythrose
    *b.* Ketoses—erythrulose
  4. Pentoses ----------------- $C_5H_{10}O_5$
    *a.* Aldoses—arabinose
        xylose
        ribose
    *b.* Ketoses—arabinulose
  5. Hexoses ----------------- $C_6H_{12}O_6$
    *a.* Aldoses—dextrose
        galactose
        mannose
    *b.* Ketoses—levulose
        sorbose
  6. Heptoses ---------------- $C_7H_{14}O_7$
    *a.* Aldoses—mannoheptose II. Disaccharides, in which $x$ is 12, $y$ is 11
  1. Lactose (milk sugar)
  2. Maltose (malt sugar)
  3. Sucrose (cane sugar)
  4. Melibiose
  5. Trehalose III. Trisaccharides, in which $x=18$, $y=16$
  1. Raffinose
  2. Melezitose IV. Tetrasaccharides, in which $x=24$ and $y$ is 21
  1. Lupeose
  2. Stachyose V. Polysaccharides, in which $x$ and $y$ is an integer greater than 18, or $C_x(H_2O)_{x-1}$
  1. Dextrins
    *a.* Achroodextrins
    *b.* Erythrodextrins
  2. Starch group
    *a.* Starches
    *b.* Inulins
    *c.* Glycogens
    *d.* Lichenins
  3. Cellulose group
    *a.* Celluloses
    *b.* Hemicelluloses
      1. Pentosans—gum arabic
      2. Hexosans—galactans
            agar-agar VI. Conjugated saccharides
  1. Gums and mucilage group
    Consisting of saccharides and acids
  2. Glucosides
    Consisting of saccharides and some other compound
  3. Tannins
    Consisting of saccharides and tannins (B) Ethers of compounds having the general formula $C_nH_{2n+2}O_n$ in which at least one of the hydroxyl hydrogens has been substituted by an alkyl, hydroxyl-alkyl, or carboxy-alkyl group:

1. Ethers, mixed ethers and ether-esters of glycerol, where the number of carbon atoms in the substituent is sufficient to give a compound of the desired high viscosity relative to glycerol.

2. Ethers, mixed ethers and ether-esters of glycols, where the number of carbon atoms in the molecule or its complexity is sufficient to give a product having the desired high viscosity relative to glycerol.

The expression "mixed" ether is intended to include compounds having two or more different substituents, whether alkyl, hydroxyl-alkyl or carboxy-alkyl groups, and the expression "ether-ester" refers to compounds in which there is present an organic acyl group, whether by substitution of one or more of the hydroxyl-hydrogens of the compounds, or whether by substitution in the alkyl, hydroxyl-alkyl or carboxy-alkyl groups of the ether, such for example as ethyl-cellulose acetate, methyl cellulose propionate, hydroxy-ethyl cellulose butyrate and the like; and any suitable derivative or substitution product of the organic ethers and compounds which through reactions in the digestive tract result in suitable ethers.

The ethers utilized in the invention are characterized by being liquids or solids which are soluble in water and in some cases soluble in aqueous solutions of ethyl alcohol, and which are non-toxic, and usually also tasteless and odorless. In many cases the pure ethers are also colorless. Such ethers are particularly suited for use in the invention because they are not objectionable to the taste, do not irritate the alimentary tract, do not objectionably change the taste or appearance of the foodstuff and are not digested or absorbed in the blood stream. Therefore, as far as the alimentary tract is concerned, the ether employed may be considered as an inert, non-digestible bulking material and in calculating the dosage to be given in a particular case, the ethers may be calculated as fillers, or additive materials.

The ethers utilized in the process of the invention may be made from the polyhydroxy aliphatic compounds of the type of $C_x(H_2O)_y$ and $C_nH_{2n+2}O_n$, by any of the conventional processes of etherification known in the art, but such process will not be described in detail for all the classes of ethers because the processes per se form no part of the present invention. However, for a more complete understanding of the invention and by way of illustrating, but not by way of limiting the invention a process will be described for producing a cellulose ether suitable for use in the invention:

The ether is prepared by etherifying a freshly precipitated cellulose hydrate derived from viscose. A suitable viscose is made by steeping 400 g. "Kipawa New Extra" wood pulp in 8000 g. of 18 per cent sodium hydroxide solution for 3 hours at 15° C. The pulp is pressed to a weight of 1200 g. and shredded for 3 hours at 20° C. and then allowed to ripen for 72 hours at 20° C. The alkali cellulose thus produced was treated with 240 g. carbon disulfide and stirred in a xanthator for 10 hours at 20° C., the reaction mass being diluted with water sufficient to give a solution containing 5 per cent by weight of cellulose. The viscose solution thus produced was allowed to age at 15° C. for 96 hours and then filtered. 8000 g. of this viscose was diluted with 9840 cc. water and heated so that the temperature rose from 20° C. to 77° C. in a period of one hour, after which the heating was stopped and the whole mass filtered and washed free of alkali with running cold water. The solids thus obtained were pressed to a weight of 3980 grams, and then dissolved in a suitable sodium hydroxide solution containing cellulose (dry basis) 6 per cent, and NaOH 7.97 per cent. To 4460 grams of this solution, heated over a water bath, there is added gradually 2220 grams of diethyl sulphate in small portions. The temperature of the reaction mass is allowed to rise from 20° C. gradually to 45° C. in two hours within which period all the diethyl sulfate has been added. The reaction product is allowed to stand one hour and the temperature permitted to rise to 60° C. The product is then cooled to 20° C. and 975 cc. of a 20% aqueous solution of acetic acid is added to neutralize the alkali. The product is dissolved in cold water and re-precipitated with hot water. There is obtained 300 g. of white ethyl cellulose which gives a clear viscous solution in cold water as well as in 40 per cent aqueous ethyl alcohol. By varying the proportion of reactants and the conditions of etherification, as well as the kind of cellulose and/or its pretreatment and of etherifying agent as well known in the art, there may be obtained cellulose ethers having widely different solubilities and viscosities in aqueous solution.

By way of illustration, but not by way of limiting the invention, there will be described a feeding test made with the foodstuff of the invention. A standard "Sherman food" comprising 189 casein, 10 g. yeast, 67 g. carbohydrate (equal parts of glucose and dextrose), 4 g. "Osborn-Mendel" salt mixture and one gram of NaCl was modified by using as the carbohydrate in the "food," 67 grams carbohydrate mixed with 33.5 grams of the ethyl cellulose above described by use of a suitable quantity of an 8% aqueous solution of the ethyl cellulose. Of this prepared food 7 grams were fed daily to four sets of rats, each set consisting of six rats of initial equal weights, a fourth set of rats being kept on the standard "Sherman food" for control. The average net increase in weight of the rats which were fed the cellulose ether at the end of fourteen days was 16 grams, whereas the average net weight increase of the "control" rats was 58 grams, the control being fed the standard "Sherman food" without the addition of the cellulose ether. A comparative examination of the blood of the rats showed a pronounced limitation of the hyperglycemic reaction in the rats receiving the cellulose ether over that of the control rats. Similar limitation of the hyperglycemic effect has been found in experiments on cats, dogs, rabbits and humans. In the case of diabetic animals, the retardation of the hyperglycemia is very pronounced when carbohydrates are ingested in the presence of the water-soluble cellulose ether.

The effects of the ingestion of carbohydrates in the presence of the water-soluble viscous ethers of carbohydrates is to retard the digestion and therefore the absorption of the carbohydrates through the walls of the intestines. As a result of this the increase in the sugar content of the blood stream is not as pronounced as that normally exhibited after the digestion of carbohydrates in the absence of such ethers. A further fundamental and valuable result of the present process is the substantial decrease in the fat produced after continued ingestion of carbohydrates in the presence of the ethers of the invention. In other words, as the amount of sugar in the blood decreases, the amount of fat deposited and built up in the tissues is substantially decreased.

Without limiting the invention to any theoretical explanation thereof, the observed results may possibly be explained by one or more of the following probable reactions:

The cellulose ethers employed in the invention are characterized by forming viscous solutions with water and in many cases the ethers form relatively stiff gels with water. It may be that such solutions or gels, when present in the digestive tract, tend to modify the rate of diffusion or osmosis of the carbohydrates and their hydrolysis products through the walls of the intestines. Inasmuch as the retardation of the absorption of disaccharides appears to be greater than that of mono-saccharides, it may be that the cellulose ethers inhibit or retard the normal hydrolysis of the disaccharides which are not normally absorbed as readily as mono-saccharides. On the other hand, since the ethers employed in the invention are polar compounds they may form addition compounds with the carbohydrates and thus retard the diffusion of the latter through the intestinal membranes.

Among the many uses to which the invention is applicable are the following:

The process of the invention may be employed in the clinical study of various types of carbohydrates and their effects upon glycemia in both normal and diabetic subjects. The use of the ethers as herein described also enable normal subjects, either human or animal, to be fed a diet higher in carbohydrates than has been possible heretofore without harmful results.

The invention, however, has particular application in enabling subjects, both human and animal, which are subject to or have a diabetic condition to take larger quantities of carbohydrates than would be possible without undesired or harmful effects in the absence of the ethers herein employed.

The invention also has particular application for all subjects, either human or animal, which tend to increase in weight when fed a normal diet containing carbohydrates, since the inclusion of the ether in the food will prevent undesired or harmful increase in fat in the body. Other important technological, physiological and clinical uses of the invention are contemplated without transcending the scope of the invention.

In the appended claims the expression "modifying the absorbability" is intended to include any inhibition, decrease, reduction, retarding or control over the amount of absorption which takes place after the ingestion of carbohydrates in the presence of the ethers employed.

The expression "polyhydroxy aliphatic compounds" as used in the appended claims is intended to include the carbohydrates, and the normally straight chain polyhydroxy compounds of the type exemplified by glycerol and the glycols.

The term "digestion" is intended to include those reactions which take place in the body after the ingestion of food and which tend to render carbohydrates absorbable.

The expression substantially "non-toxic" as used in the appended claims is intended to mean that the ethers employed are, in the concentration used in the invention, substantially harmless to the health of the particular man or animal.

It is to be understood that the foregoing detailed description is given merely by way of illustration and that many variations may be made therefrom without departing from the spirit of the invention.

I claim:

1. The process of modifying the absorbability of carbohydrates comprising ingesting in the alimentary tract a digestible carbohydrate selected from the class consisting of mono-saccharides, di-saccharides, conjugated saccharides, dextrine and starch and a substantially non-toxic water-soluble ether of a polyhydroxy aliphatic compound, said ether being present in sufficient amount to reduce the absorbability of said carbohydrate in the digestive tract.

2. The process of modifying the absorbability of carbohydrates comprising ingesting in the alimentary tract a digestible carbohydrate selected from the class consisting of mono-saccharides, di-saccharides, conjugated saccharides, dextrine and starch and a substantially non-toxic water-soluble ether of a polyhydroxy aliphatic compound selected from compounds having the general formulæ $C_x(H_2O)_y$ and $C_nH_{2n+2}O_n$, in which $x$, $y$, and $n$ are integers having a value of 2 or more, said ether being present in sufficient amount to reduce the absorbability of said carbohydrates.

3. The process of modifying the absorbability of carbohydrates comprising ingesting a digestible carbohydrate selected from the class consisting of mono-saccharides, di-saccharides, conjugated saccharides, dextrine and starch in the alimentary tract in the presence of a water-soluble ether of a carbohydrate, said ether being present in sufficient amount to reduce the absorbability of said carbohydrate.

4. The process of modifying the absorbability of carbohydrates comprising ingesting a digestible carbohydrate selected from the class consisting of mono-saccharides, di-saccharides, conjugated saccharides, dextrine and starch in the alimentary tract in the presence of a non-toxic water-soluble ether of cellulose, said ether being present in sufficient amount to reduce the absorbability of said carbohydrate.

5. Process of modifying the absorbability of carbohydrates upon digestion comprising mixing a digestible carbohydrate selected from the class consisting of mono-saccharides, di-saccharides, conjugated saccharides, dextrine and starch with a substantially non-toxic water-soluble ether of a polyhydroxy aliphatic compound and feeding said mixture, said ether being fed in sufficient amount to reduce the absorbability of said carbohydrate.

6. The process of modifying the absorbability of carbohydrates during digestion comprising feeding a non-toxic water-soluble organic ether of a polyhydroxy aliphatic compound and thereafter feeding a digestible carbohydrate selected from the class consisting of mono-saccharides, di-saccharides, conjugated saccharides, dextrine and starch, the amount of said ether fed being sufficient to reduce the absorbability of said carbohydrate.

7. A product comprising a carbohydrate and a substantially non-toxic water-soluble ether of a polyhydroxy aliphatic compound, the digestible carbohydrate selected from the class consisting of mono-saccharides, di-saccharides, conjugated saccharides, dextrine and starch having a reduced absorbability upon digestion as compared with the same product without said organic ether.

8. A product comprising a digestible carbohydrate selected from the class consisting of mono-saccharides, di-saccharides, conjugated saccharides, dextrine and starch and a substantially non-toxic water-soluble ether of a polyhydroxy aliphatic compound selected from compounds having the general formulae $C_x(H_2O)_y$ and $C_nH_{2n+2}O_n$, in which $x$, $y$, and $n$ are integers having a value of 2 or more, said ether being present in sufficient amount to reduce the absorbability of said carbohydrate upon digestion.

9. A product comprising a digestible carbohydrate selected from the class consisting of mono-saccharides, di-saccharides, conjugated saccharides, dextrine and starch and a water-soluble ether of a carbohydrate, said ether being present in sufficient amount to reduce the absorbability of said carbohydrate upon digestion.

10. A product comprising a digestible carbohydrate selected from the class consisting of mono-saccharides, di-saccharides, conjugated saccharides, dextrine and starch and a non-toxic water-soluble ether of cellulose, said ether being present in sufficient amount to reduce the absorbability of said carbohydrate.

11. A foodstuff having a reduced absorbability upon digestion comprising a di-saccharide and a water-soluble cellulose ether.

12. A foodstuff having a reduced absorbability upon digestion comprising a mono-saccharide and a water-soluble cellulose ether.

13. A digestible carbohydrate selected from the class consisting of mono-saccharides, di-saccharides, conjugated saccharides, dextrine and starch containing in admixture a substantially non-toxic water-soluble ether formed from a polyhydroxy aliphatic compound said ether being present in such an amount as to substantially reduce the absorbability of said carbohydrate upon digestion.

14. The herein described edible product which comprises essentially a non-liquid food material which in ordinary ingestion is masticated and which contains normally assimilable carbohydrate as a large part of its food value content, and which carbohydrate would normally be subject to being absorbed in the digestive tract in the form of sugars when such food material is ingested as such, said food material being admixed with a water-soluble, non-toxic ether of a carbohydrate, such latter component being present in a proportion sufficient to greatly reduce the assimilation of said carbohydrate by the being ingesting the same, whereby said edible product, when ingested does not so greatly increase the sugar content of the blood as would said food material if ingested alone.

15. The herein described edible product which comprises essentially a non-liquid food material which in ordinary ingestion is masticated and which contains normally assimilable carbohydrate as a large part of its food value content, and which carbohydrate would normally be subject to being absorbed in the digestive tract in the form of sugars when such food material is ingested as such, said food material being admixed with a water-soluble, non-toxic ether of a carbohydrate, such latter component being present in the proportion of about 10% to 50%, based on the weight of said normally assimilable carbohydrate, figured on the dry basis.

16. An edible product as described, which contains a starchy food material in admixture with a water-soluble non-toxic carbohydrate ether, the amount of the latter being equivalent to about 10% to 50% of the amount of the normally assimilable carbohydrate content of said food material, figured on the dry basis.

17. An edible product as described, which contains a food material containing a sugar as a major food component, in admixture with a water-soluble non-toxic carbohydrate ether, the amount of the latter being equivalent to about 10% to 50% of the amount of the normally assimilable carbohydrate content of said food material, figured on the dry basis.

18. An edible product as described which contains milk sugar as a substantial food component, in admixture with a water-soluble non-toxic carbohydrate ether, the amount of said ether being equivalent to about 10% to 50% of the amount of the normally assimilable carbohydrate content of said edible product, figured on the dry basis.

ROGER WALLACH.